United States Patent [19]
Brugger

[11] Patent Number: 5,431,520
[45] Date of Patent: Jul. 11, 1995

[54] DISC-SHAPED OBJECT STORAGE AND RETRIEVAL MECHANISM AND METHOD FOR USING SAME

[75] Inventor: Charles E. Brugger, Rochester, N.Y.

[73] Assignee: Eastman Kodak Company, Rochester, N.Y.

[21] Appl. No.: 236,746

[22] Filed: Apr. 29, 1994

[51] Int. Cl.⁶ ............................................. G11B 17/12
[52] U.S. Cl. .................................. 414/277; 369/36; 369/204; 414/786; 414/937
[58] Field of Search ............... 414/277, 278, 283, 331, 414/416, 786, 937; 360/98.04, 99.06, 99.07; 369/36, 37, 39, 204, 205, 202, 75.2

[56] References Cited

U.S. PATENT DOCUMENTS

| | | | |
|---|---|---|---|
| 1,595,241 | 8/1926 | Nelson | 369/39 |
| 2,003,424 | 6/1935 | Brandstrom | 369/192 |
| 2,205,268 | 6/1940 | Mitchell | 369/38 |
| 2,935,325 | 5/1960 | Durant | 369/192 |
| 4,567,584 | 1/1986 | Kawakami | 369/36 X |
| 4,608,679 | 8/1986 | Rudy et al. | 369/39 X |
| 4,633,452 | 12/1986 | Shimbo et al. | 369/36 X |
| 4,853,916 | 8/1989 | Tomita | 360/99.07 X |
| 5,107,475 | 4/1992 | Serita et al. | 369/39 |
| 5,136,563 | 8/1992 | Takemasa et al. | 369/36 |
| 5,163,040 | 11/1992 | Hake | 369/204 |
| 5,307,331 | 4/1994 | d'Alayer de Costemore d'Arc | 360/98.04 X |
| 5,319,621 | 6/1994 | Amar | 369/36 X |

Primary Examiner—David A. Bucci
Attorney, Agent, or Firm—Raymond L. Owens

[57] ABSTRACT

A disc-shaped object storage and retrieval mechanism uses storage grooves corresponding to the radius of a disc-shaped object, such as an audio or photo compact disc or video disc, and a curvilinear track with a curve determined by the diameter of the disc-shaped object, to move the disc-shaped object from a storage position to a transport position by a single roller. The mechanism has a disc-shaped object storage structure in the form of a magazine and a movable picker assembly having a picker arm with a curvilinear track that receives an edge of a disc-shaped object and supports the disc-shaped object along this edge. The movable picker assembly has a picker wheel that is movable into engagement with an edge of the disc-shaped object. Accordingly, when the picker wheel turns the disc-shaped object, it drives the disc-shaped object into or out of the disc-shaped object storage magazine. The moveable picker assembly is vertically driven to position the picker arm adjacent to a disc-shaped object location in the disc-shaped object storage magazine where a disc-shaped object is to be retrieved or stored.

25 Claims, 4 Drawing Sheets

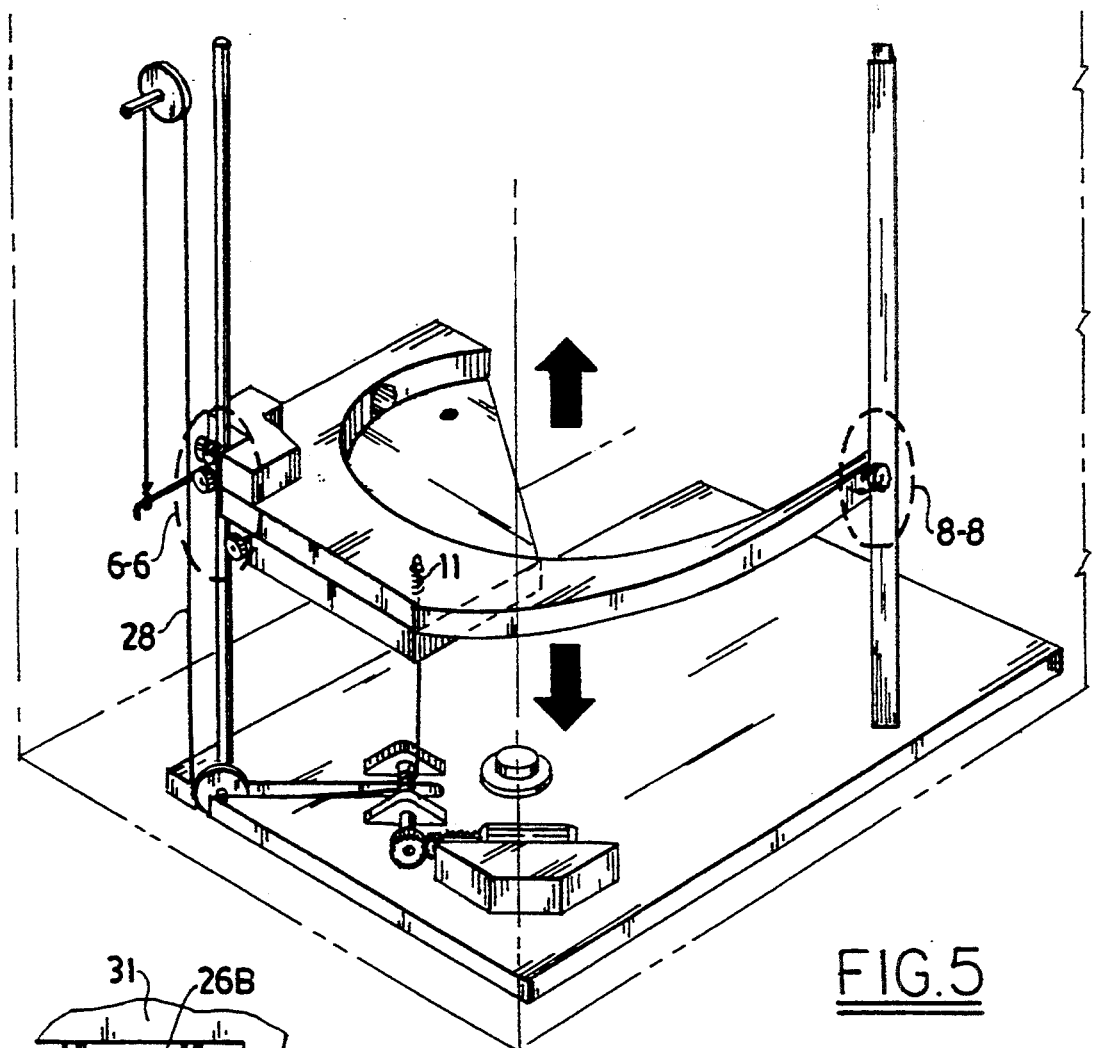
FIG.5
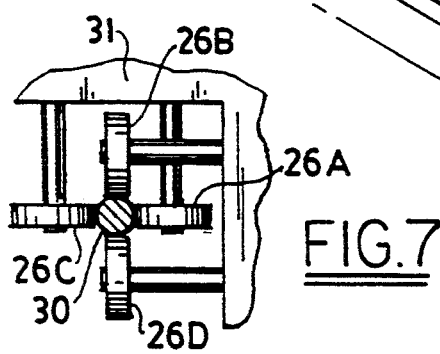
FIG.7
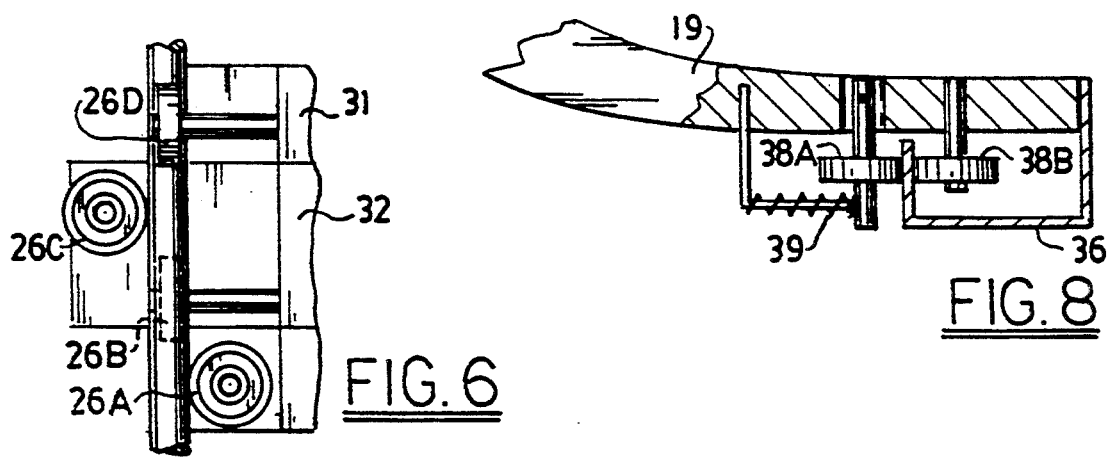
FIG.6
FIG.8

5,431,520

DISC-SHAPED OBJECT STORAGE AND RETRIEVAL MECHANISM AND METHOD FOR USING SAME

FIELD OF THE INVENTION

The present invention relates to a disc-shaped object storage and retrieval mechanism and method for using same. More particularly, the present invention provides a disc-shaped object storage and retrieval mechanism which allows disc-shaped objects, such as compact discs and photo compact discs, to be stored and retrieved from a library.

BACKGROUND OF THE INVENTION

There are many applications requiring the storage and handling of disc-shaped objects (hereinafter referred to as "discs") allowing contact only on their edges. One example of this would be in a library for storing optical discs, audio compact discs, photo compact discs, etc. Other kinds of discs that may only be touched at the edges that may be suitable for robotic handling include silicon wafers in an integrated circuit fabrication facility, lenses, mirrors, optical filters or other optics in a fabrication, coating or assembly facility, etc.

For example, in U.S. Pat. No. 5,107,475, an automatic disc changer is disclosed in which tray guides are provided on a large number of levels in a case at right and left portions thereof so that the center line of the guide on each of the levels of the right portion and that of the guide on the level of the left portion extend toward a tray transfer mechanism and meet each other in the form of a V. The tray transfer mechanism can be moved up and down between each of the guides and a disc player for playing a disc in a tray transferred by the tray transfer mechanism, be swung from a central portion to positions corresponding to the guides on each of the levels at the right and left portions, and be moved backward and forward, to and from each of the guides.

Furthermore, in most libraries, separate disc transfer and support members are used to store and retrieve discs. Such members do not utilize the round shape of the discs in moving them between the storage slots and drives. This requires extra parts to be contained in the carriers or cassettes for each disc, complex mechanisms for sliding the disc carriers without jamming, and the need to have a mechanism to separate the carrier from the disc or open a shutter. Hence, to spin the disc, the disc must be separated from the carrier or a shutter on the cassette must be opened. Also, these mechanisms not only creates debris associated with sliding the separate transfer and support members, but also the carriers or cassettes often wear out.

SUMMARY OF THE INVENTION

The present invention was made in order to solve the above-mentioned problems.

Accordingly, it is an object of the present invention to provide a disc storage and retrieval mechanism which allows the disc to be stored in a library without providing a separate disc transfer and support member and utilizes the round shape of the discs in moving them between the storage slots and drives. This eliminates, among other things, the extra parts contained in the carriers or cassettes for each disc, complex mechanisms for sliding the rectangular carriers without jamming, the need to separate the carrier from the disc or open a shutter and the mechanism to do so and wear and debris associated with sliding a rectangular carrier.

Another object of the present invention is to provide a disc storage and retrieval mechanism having storage grooves corresponding to the radius of a disc and a curvilinear track with a curve determined by the diameter of a disc, whereby the disc can be moved from a storage position to a transport position by means of a single roller.

These and other objects are provided by a disc storage and retrieval mechanism comprising a disc storage means in the form of a magazine, which can be removable for bulk-loading of the magazine. A movable picker assembly having a picker arm with a curvilinear track that receives an edge of a disc and supports the disc along this edge. The movable picker assembly has a picker wheel that is movable into engagement with an edge of the disc. When the picker wheel turns the disc, it drives the disc into or out of the storage magazine. The moveable picker assembly is vertically driven to position the picker arm adjacent to a disc location in the storage magazine where a disc is to be retrieved or stored.

It is to be understood that the disc storage and retrieval mechanism of the present invention can be incorporated into any machine or device which could utilize the inventive principles disclosed herein. Such machines or devices are not shown in detail in the drawings or fully described herein to simplify illustration of the invention.

In a preferred embodiment, the invention includes a movable picker assembly that travels in a vertical direction. The movable picker assembly has a curved picker arm that extends toward a storage magazine of discs. Each disc is supported in the storage magazine by a curvilinear V-shaped edge. The picker arm has a corresponding curvilinear V-shaped edge for capturing one edge of the disc as it is driven out of the storage magazine by a picker wheel which is disposed on the opposite side of the movable picker assembly from the picker arm. Retention of the disc in the storage magazine and in the picker arm can be had by a simple spring detent. The curved channels in the picker arm and storage magazine have a V-shaped groove or a U-shaped profile to provide for keeping the disc in plane with the contact forces provided by the roller and the detent features. The picker wheel moves and engages the edge of the disc that resides in the storage magazine. When the picker wheel turns, the disc is driven out of the storage magazine along the curvilinear track of the picker arm and into the disc supporting section of the movable picker assembly. This method can be used with the plane of rolling of the discs either horizontal or vertical. The movable picker assembly may then be lowered to a suitable position and the disc driven out of the movable picker assembly onto a spindle means, which could be located directly below the storage magazine. Alternatively, the picker assembly could be driven vertically upward to a different spindle means.

In one embodiment, the picker wheel is mounted on the end of a picker lever. A drive pulley mounted at the point of the picker lever has a drive belt coupled to the shaft of the picker wheel. The picker lever itself is moved into and out of engagement with the edge of a disc by a picker lever actuation means. Another spring returns the picker wheel to its disengage position when the picker lever actuation means is reversed, if necessary. In another embodiment, a motor with a worm-drive gear moves the picker lever and the picker wheel into positive engagement with the edge of a disc. Alternatively, the movable picker assembly could be configured to serve two storage magazines, preferably with still only one picker lever.

According to yet another aspect of the present invention, a movable picker assembly travels up and down an elevator guide rod. Four rollers are mounted at equal angles around the elevator guide rod and provide the constraint for moving the movable picker assembly up and down the elevator guide rod. The elevator guide rod and the four rollers provide support for the movable picker assembly. One end of a cable is connected to an outside edge of the movable picker assembly. The other end of the cable is connected via a spring over a series of pulleys and a capstan to the center of gravity of the movable picker assembly, wherein moving the cable results in the movement of the movable picker assembly along the elevator guide rod. The offset arrangement of the cable, with or without the weight of the movable picker assembly, keeps the four rollers in contact with the elevator guide rod. Two additional rollers located on the picker arm, which follow the surfaces of a support and guide brace, complete the exact contraint of the movable picker assembly.

In an alternative embodiment, the movable picker assembly is mounted between an elevator guide rod and a worm drive screw. A portion of the movable picker assembly is equipped with guide rollers to bear against the elevator guide rod, thereby constraining the movable picker assembly as it vertically travels up and down the elevator guide rod and the worm drive shaft.

Still other objects and advantages of the present invention will become readily apparent to those skilled in the art from the following detailed description, wherein only the preferred embodiments of the invention are shown and described, simply by way of illustration of the best mode contemplated of carrying out the invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 5 is a partial plan perspective similar to FIG. 1;

FIG. 6 is a vertical cross-sectional view taken generally along line 6—6 of FIG. 5;

FIG. 7 is a plan view of the cross-section shown in FIG. 6;

FIG. 8 is a detailed sectional view taken generally along line 8—8 of FIG. 5;

DETAILED DESCRIPTION OF THE INVENTION

An embodiment of the present invention is hereafter described with reference to the drawings attached hereto.

Figure 1:
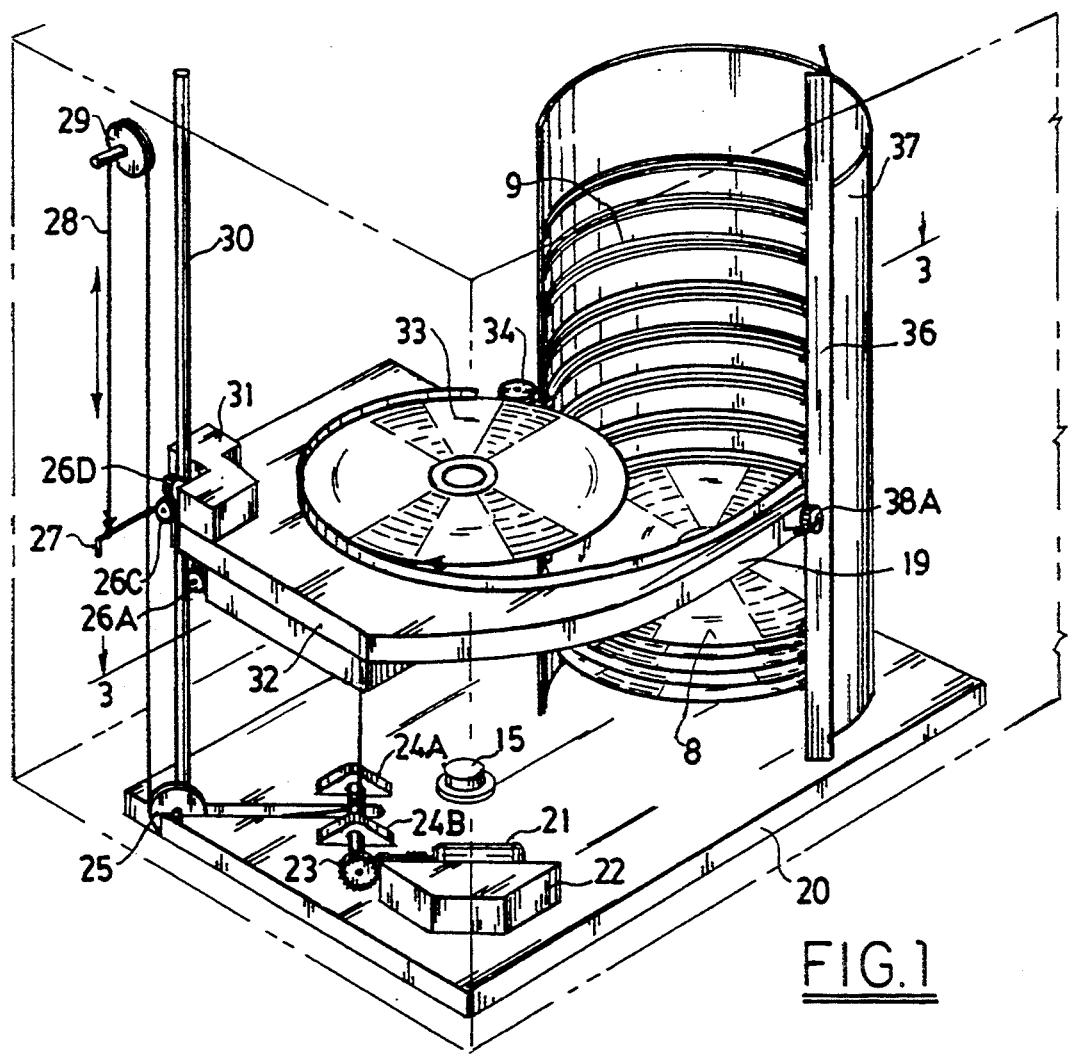
FIG. 1 is a perspective view of a disc-shaped object storage and retrieval mechanism, which is an embodiment of the present invention.
Figure 3:
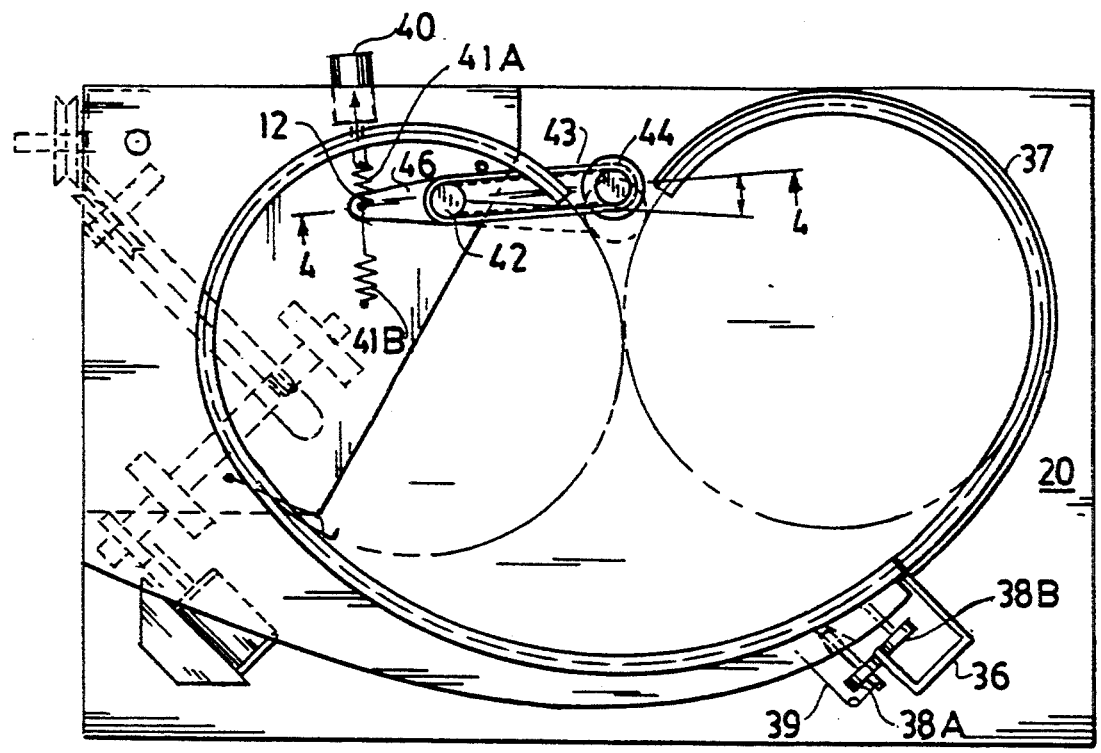
FIG. 3 is a sectional view of a preferred embodiment of the picker arm and magazine taken generally along line 3—3 of FIG. 1 viewed downwardly through the movable picker assembly.

Referring now to the drawings, FIG. 1 shows an embodiment of the present invention wherein 20 is a base or chassis, 21 is a motor which is supported by a housing 22 containing controlling mechanisms or circuitry (not shown); motor 21 drives a capstan 23, which is seated in journals 24A and 24B. A lower elevator pulley 25 is rotatably supported in base 20. Four guide rollers 26A, 26B (shown in FIG. 6), 26C, and 26D are mounted to a movable picker assembly 32 and to a roller support block 31. Guide rollers 26A–26D act to constrain movable picker assembly 32 as it moves vertically along an elevator guide rod 30. Guide rollers 26A–26D are equidistantly laterally spaced about elevator guide rod 30. Guide rollers 26A–26D and elevator guide rod 30 provide a means for supporting movable picker assembly 32. A pin 27, which is firmly seated in movable picker assembly 32, serves to fix one end of a cable 28, which is threaded over an upper elevator pulley 29, a lower elevator pulley 25, capstan 23 and fixed at an opposite end to a tension spring 11 (shown in FIG. 5). Cable 28 may be threaded through a center channel (not shown) in capstan 23 or be wound about capstan 23 via contact frictional forces produced by tension spring 11. Turning of capstan 23 moves cable 28 resulting in vertical motion of movable picker assembly 32. Cable could be oriented about capstan 23 in any manner which minimizes or prevents slippage. A disc 33 is shown in a curvilinear V-shaped groove (not shown) in an inside front surface of movable picker assembly 32. A picker wheel 34 is shown contacting a surface edge 14 of disc 33. Picker wheel 34 may have a curvilinear V-shaped groove (not shown) about its circumference which corresponds to the shape of edge 14 of disc 33. An upper elevator pulley 29 supports cable 28 above the travel of movable picker assembly 32. Several additional discs 8 are shown stored in a stacked-like configuration in curvilinear V-shaped groove storage slots 9 in a storage magazine 37. The number of discs that can be stored in storage magazine 37 is dependent upon the thickness of the stored discs. In order to maximize the storage capability of storage magazine 37, it is desirable to configure disc storage magazine 37 to store as many discs as would be physically possible, i.e., to maximize the disc packing density with respect to curvilinear V-shaped groove storage slots 9. Guide rollers 38A and 38B (38B is shown in FIG. 3) are located at the end of a picker arm 19 in contact with support and guide brace 36. A spindle means 15 is shown seated in base or chassis 20. Spindle means 15 could also be oriented above movable picker assembly 32.

The enclosing dashed line oriented about the disc storage and retrieval mechanism of FIG. 1 is representative of any machine or device which could benefit from the principles embodied in the present invention. It would be known to one skilled in the art that the present invention could be adapted to be incorporated into any such machine or device, e.g., as a removable unit or cartridge, rigidly mounted or integrated into the machine or device itself, etc.

Also, the present invention includes suitable control and circuitry means (not shown). Said control and circuitry means are hereby incorporated into the present invention. The curvilinear V-shaped grooves of both movable picker assembly 32 and storage magazine 37 conform to the diameter of the discs to be stored and transported.

Figure 2:
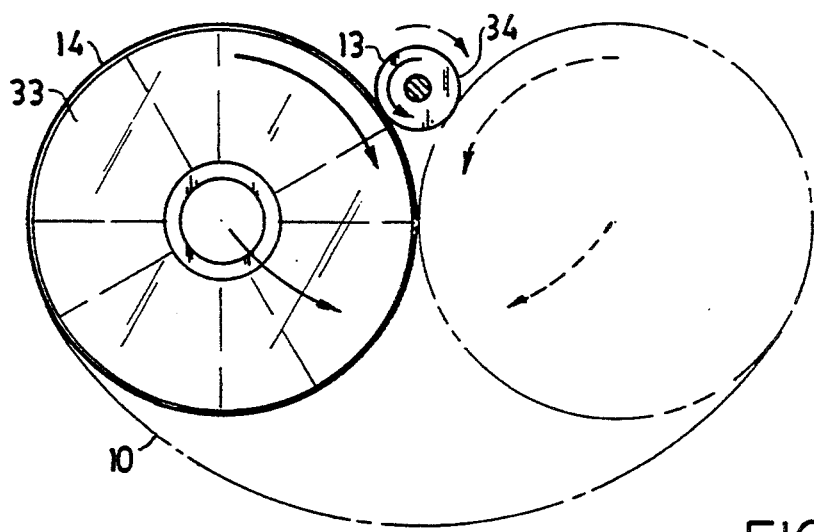
FIG. 2 is a partial plan view of a disc transferred by said mechanism.

In FIG. 2, a travel path 10 of disc 33 is shown. An edge 14 of disc 33 is in contact with an edge 13 of picker wheel 34. To remove disc 33 that is stored in storage magazine 37, picker wheel 34 is brought into contact with edge 14 of disc 33 (explained below in FIG. 3), picker wheel 34 rotates in a clockwise fashion, disc 33 is then caused to travel from curvilinear V-shaped groove storage slots 9 in storage magazine 37 to curvilinear V-shaped groove (not shown) of movable picker assembly 32. To return disc 33 to storage magazine 37, picker wheel 34 is brought into contact with edge 14 of disc 33, picker wheel 34 then rotates in a counter-clockwise fashion, thereby causing disc 33 to travel along curvilinear V-shaped groove (not shown) of movable picker assembly 32 until it is returned to curvilinear V-shaped groove storage slot 9 in storage magazine 37. The radius of curvilinear V-shaped groove storage slots 9 and curvilinear V-shaped groove (not shown) of movable picker assembly 32 corresponds to the radius of disc 33, while travel path 10 corresponds approximately to the diameter of disc 33.

FIG. 3 shows a sectional plan view of picker arm 19 and storage magazine 37 taken generally along line 3—3 of FIG. 1 looking downwardly through movable picker assembly 32. A picker lever actuation means 40 acts on one end 12 of a picker lever 46 (shown in greater detail in FIG. 4) to rotate picker lever 46 and cause picker wheel 34 to engage edge 14 of disc 33. Picker lever actuation means 40 can be any actuation means known to the art that will not change state, i.e., will not allow picker lever 46 to disengage unless commanded to do so, thereby preventing a disc from being dropped should power be interrupted during disc transfer. A first picker lever spring 41A ensures that there is sufficient contact pressure by picker wheel 34 against edge 14 of disc 33. A second picker lever spring 41B assists the motion of picker lever 46, if necessary, when it is disengaged from its contact with edge 14 of disc 33 by picker lever actuation means 40. A drive belt 43 is wound about a first picker lever pulley 42 and about a second picker lever pulley 44. Guide rollers 38A and 38B are shown in contact with support and guide brace 36. A bias spring 39 maintains sufficient contact pressure between guide roller 38A and support and guide brace 36.

Figure 4:
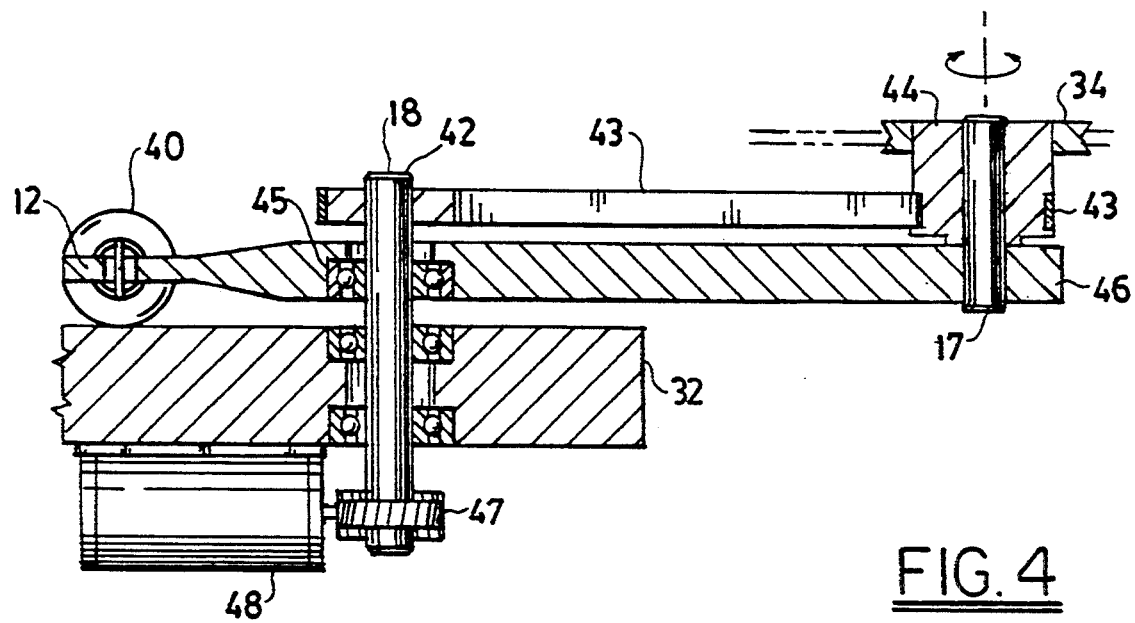
FIG. 4 is a cross-sectional view taken generally along line 4—4 of FIG. 3.

FIG. 4 shows a cross-sectional view of picker lever assembly 32 taken generally along line 4—4 of FIG. 3. Picker lever 46 moves about a drive shaft 18. A drive belt 43 is wound about first picker lever pulley 42 located at the top of drive shaft 18 and about second picker lever pulley 44 located below picker wheel 34 that is mounted on second picker lever pulley 44. Second picker lever pulley 44 rotates on shaft 17, said shaft 17 being seated in picker lever 46 itself. Drive shaft 18 is located through movable picker assembly 32 and is coupled to one end of a drive gear 47. Drive gear 47 is connected to a picker wheel motor 48. Drive shaft 18 rotates easily due to the presence of ball bearings 45 oriented about shaft 18 in a friction-reducing manner.

Picker wheel motor 48 causes drive gear 47 to rotate drive shaft 18 thereby rotating first picker lever pulley 42. First picker lever pulley 42 rotates belt 43 which in turn rotates second picker lever pulley 44, thereby rotating picker wheel 34.

FIG. 5 shows a partial plan perspective similar to FIG. 1. Cable 28 is shown attached to tension spring 11.

FIGS. 6 and 7 show a vertical sectional view and a plan view, respectively, taken generally along line 6—6 of FIG. 5. Guide rollers 26A, 26B, 26C, and 26D are shown oriented about elevator guide rod 30. In one embodiment, guide rollers 26A and 26B are seated in movable picker assembly 32, while guide rollers 26C and 26D are seated in roller support block 31. This provides for adjustment of the orientation of movable picker assembly 32. Guide rollers 26A–26D are spaced ninety degrees apart and act to evenly bias movable picker assembly 32 about elevator guide rod 30 thereby providing a means to support movable picker assembly 32 and allowing for the smooth and exacting vertical movement of movable picker assembly 32 along elevator guide rod 30.

FIG. 8 is a detailed sectional view taken generally along line 8—8 of FIG. 5 showing guide rollers 38A and 38B oriented about support and guide brace 36. Guide rollers 38A and 38B are seated in picker arm 19. Bias spring 39 ensures sufficient pressure contact between guide roller 38A and support and guide brace 36. Guide rollers 38A and 38B act to evenly bias picker arm 19 about support and guide brace 36 thereby allowing for the smooth and exacting vertical movement of picker arm 19 along support and guide brace 36.

Figure 9:
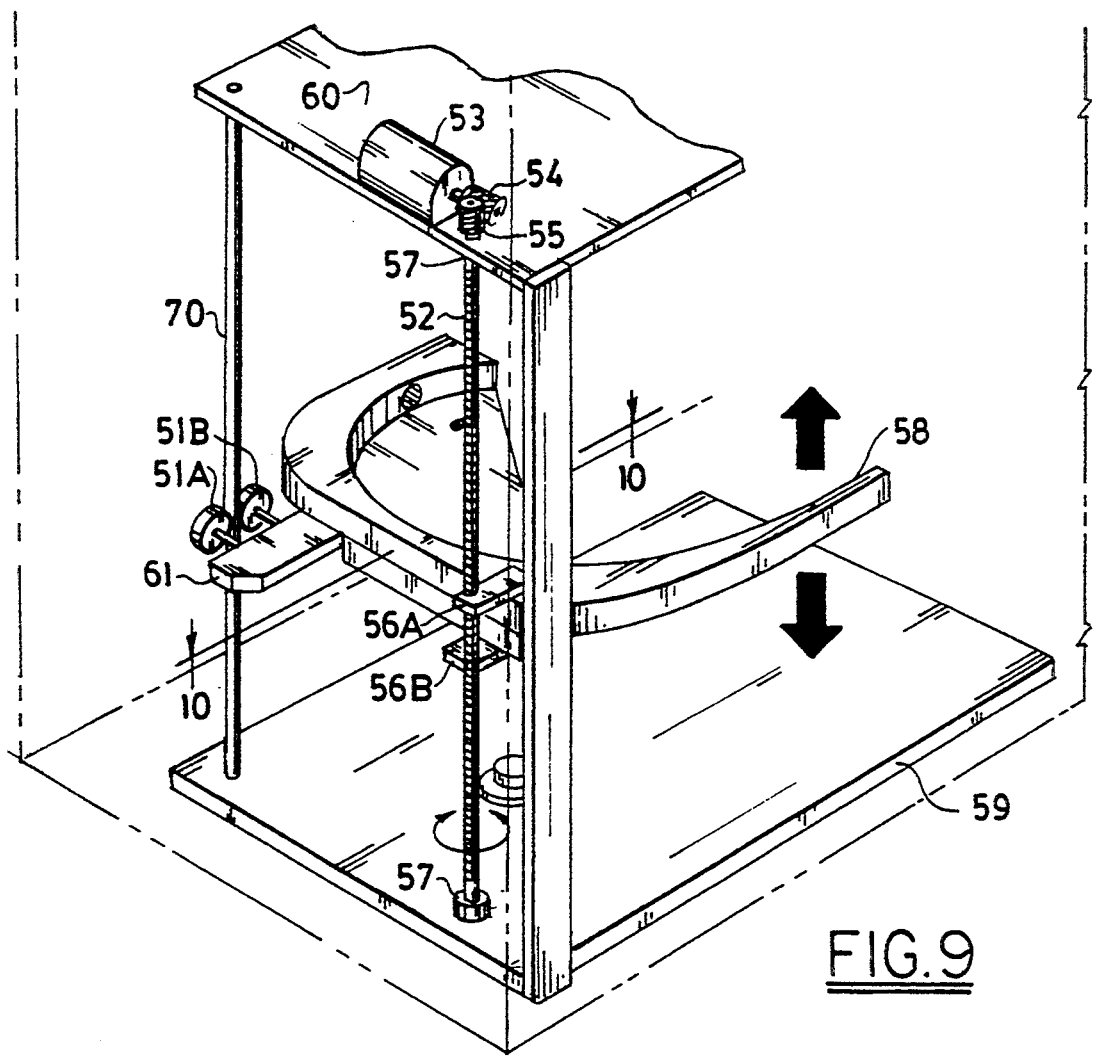
FIG. 9 is a second embodiment of the present invention showing an alternative movable picker assembly.

FIG. 9 shows an alternative embodiment of the present invention. A worm drive motor 53, seated on an alternative support 60, actuates a first worm gear 54 which in turn rotates a second worm gear 55 which is located at one end of a worm drive shaft 52. Worm drive shaft 52 interfaces with an alternative movable picker assembly 58 via two threaded flanges 56A and 56B and is seated in an alternative base or chassis 59 via a bearing 57. Worm drive shaft 52 easily rotates within bearing 57. Two guide rollers, 51A and 51B, are supported by an alternative roller support block 61 of movable picker assembly 58 and are oriented about an alternative elevator guide rod 70. Guide rollers 56A and 56B act to evenly bias movable picker assembly 58 about elevator guide rod 70 thereby providing a means for supporting movable picker assembly 58 and allowing for the smooth and exacting vertical movement of movable picker assembly 58 along elevator guide rod 70. Guide rollers 51A and 51B would preferably have a bias spring similar to bias spring 39.

In this embodiment, worm drive motor 53 rotates worm drive shaft 52 causing movable picker assembly 58 to travel vertically along elevator guide rod 70. The force required to lift and lower movable picker assembly 58 is generated at the interface of worm drive shaft 52 and threaded flanges 56A and 56B. As worm drive shaft 52 rotates, threaded flanges 56A and 56B translate the rotational force into vertical movement of movable picker assembly 58.

Figure 10:
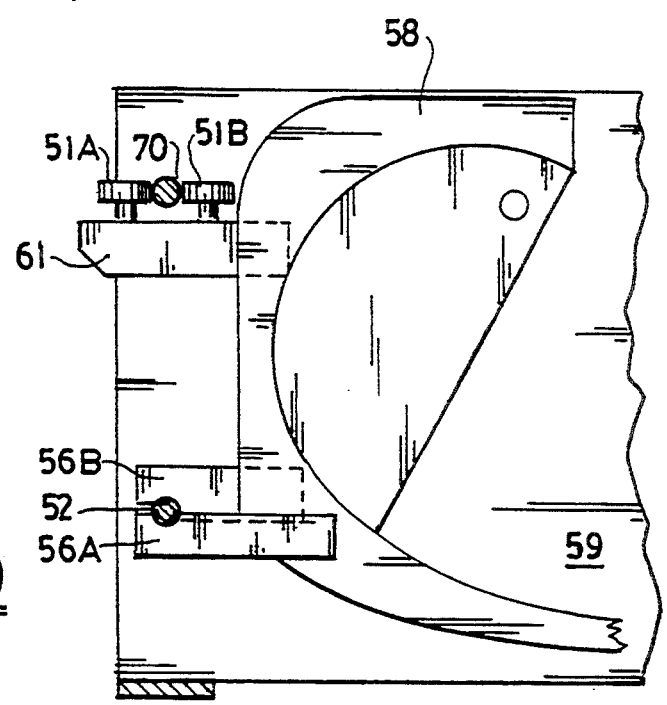
FIG. 10 is a cross-sectional view taken generally along line 10—10 of FIG. 9 showing the guide rollers and threaded flanges.

FIG. 10 shows a cross-sectional view taken generally along line 10—10 of FIG. 9 showing guide rollers 51A and 51B and threaded flanges 56A and 56B. In one embodiment, threaded flanges 56A and 56B are in a stacked orientation, i.e., half flanges, one above the other, on opposite sides of worm drive shaft 52. The threaded surfaces of threaded flanges 56A and 56B are preferably oriented on a line emanating from a center of gravity of movable picker assembly 58. Other embodiments are possible, e.g., two full flanges one above the other, or a single full flange.

In order to engage disc 33 that is stored above the level of movable picker assembly 32 in storage magazine 37, motor 21 is directed by control and circuitry means (not shown) to actuate capstan 23 in a counterclockwise manner which causes cable 28 to move. The movement of cable 28, which passes under lower elevator pulley 25, over upper elevator pulley 29 and is attached to pin 27, causes movable picker assembly 32 to travel vertically upward, guided by elevator guide rod 30. Movable picker assembly 32 is laterally constrained by both guide rollers 26A-26D and guide rollers 38A and 38B. The movement of movable picker assembly 32 is halted at a predetermined position corresponding to the level of curvilinear V-shaped groove storage slot 9 in storage magazine 37 which contains the desired disc 33. If the desired disc 33 is stored below the level of movable picker assembly 32, motor 21 would actuate capstan 23 in a clockwise manner, thereby lowering movable picker assembly 32.

Once movable picker assembly 32 is at the proper level opposite a stored disc 33, picker lever actuation means 40 actuates picker lever 46 to engage edge 14 of disc 33. In the disc-engage position, edge 14 of disc 33 is in contact with curvilinear V-shaped groove edge 13 of picker wheel 34. Picker wheel motor 48 turns drive shaft 18 thereby rotating first picker lever pulley 42. First picker lever pulley 42 rotates drive belt 43 which in turn rotates second picker lever pulley 44 about drive shaft 17, thereby causing picker wheel 34 to rotate in a clockwise fashion. As picker wheel 34 rotates, disc 33 will be driven and guided along the curvilinear V-shaped groove (not shown) of movable picker assembly 32 to a stop position. Picker wheel 34 must then be retracted. Movable picker assembly 32 is then lowered, as described above, and places disc 33 upon spindle means 15. For example, spindle means 15 may be part of a disc information reproduction system in a video disc player, an audio compact disc player, or a photo compact disc player. Picker lever 46 is then disengaged from contact with edge 14 of disc 33 by the actuation of picker lever actuation means 40. The above process is simply reversed to return disc 33 to its proper curvilinear V-shaped groove storage slot 9, i.e., a counterclockwise rotation of picker wheel 34 will return disc 33 to curvilinear V-shaped groove storage slot 9.

It is to be clearly understood that the present invention would have utility in any situation in which the transport of a disc-shaped object according to the principles of the present invention is desired, e.g., rolling a disc-shaped object by its edge with a single roller. For instance, disc 33 can be selected from the group consisting of a video disc, an audio compact disc, a photo compact disc, a silicon wafer, a lens, a mirror, an optical filter, and the like.

The invention has been described with reference to preferred embodiments. However, it will be appreciated that variations and modifications can be effected by a person of ordinary skill in the art without departing from the scope of the invention.

PARTS LIST FOR FIGS. 1-10
Kodak 67,217/RLO/78690

1.
2.
3.

PARTS LIST FOR FIGS. 1-10
Kodak 67,217/RLO/78690

4.
5.
6.
7.
8. stored discs
9. curvilinear V-shaped groove storage slot
10. disc travel path
11. tension spring
12. (picker lever actuation means) end of picker lever
13. edge of picker wheel
14. surface edge of disc
15. spindle means
16.
17. shaft
18. drive shaft
19. picker arm
20. base or chassis
21. motor
22. housing
23. capstan
24A. journal
24B. journal
25. lower elevator pulley
26A. guide roller
26B. guide roller
26C. guide roller
26D. guide roller
27. pin
28. cable
29. upper elevator pulley
30. elevator guide rod
31. roller support block
32. movable picker assembly
33. disc
34. picker wheel
35.
36. support and guide brace
37. disc storage magazine
38A. guide roller
38B. guide roller
39. bias spring
40. picker lever actuation means
41A. first picker lever spring
41B. second picker lever spring
42. first picker lever pulley
43. drive belt
44. second picker lever pulley
45. ball bearings
46. picker lever
47. drive gear
48. picker wheel motor
49.
50.
51A. guide roller
51B. guide roller
52. worm drive shaft
53. worm drive motor
54. first worm gear
55. second worm gear
56A. threaded flange
56B. threaded flange
57. bearing
58. (alternative) movable picker assembly
59. (alternative) base or chassis
60. (alternative) support
61. (alternative) roller support block
62.
63.
64.
65.
66.
67.
68.
69.
70. (alternative) elevator guide rod

What is claimed is:

1. A disc-shaped object storage and retrieval mechanism comprising:
   a disc-shaped object storage means for storing a plurality of disc-shaped objects;
   a movable picker assembly which comprises:
      a picker arm support means;
      a picker arm extending from said picker arm support means and having a curvilinear track for receiving an edge of a disc-shaped object and supporting said disc-shaped object along said edge; and
      a picker wheel selectively movable into engagement with an edge of said disc-shaped object for rotating and driving said disc-shaped object along said track into and out of said disc-shaped object storage means, and
      a means for moving said movable picker assembly.

2. A disc-shaped object storage and retrieval mechanism according to claim 1 which further comprises:
   a means for actuating said picker wheel; and
   a spindle means for receiving a disc-shaped object from said movable picker assembly and for rotating said disc-shaped object.

3. A disc-shaped object storage and retrieval mechanism according to claim 1, wherein said movable picker assembly is vertically displaceable.

4. A disc-shaped object storage and retrieval mechanism according to claim 1, wherein said disc-shaped object storage means comprises a magazine with a plurality of disc-shaped object-supporting V-shaped groove edges for storing disc-shaped objects aligned with one another and spaced apart along a common axis.

5. A disc-shaped object storage and retrieval mechanism according to claim 2, wherein said actuation means is a motorized capstan.

6. A disc-shaped object storage and retrieval mechanism according to claim 2, wherein said actuation means is a motor with a worm-gear drive.

7. A disc-shaped object storage and retrieval mechanism according to claim 1, wherein said disc-shaped object is selected from the group consisting of a video disc, an audio compact disc, a photo compact disc, a silicon wafer, a lens, a mirror, and an optical filter.

8. A disc-shaped object storage and retrieval mechanism according to claim 1, wherein said curvilinear track has a radius of curvature corresponding to a diameter of a disc-shaped object.

9. A disc object storage and retrieval mechanism according to claim 1, wherein said means for moving said movable picker assembly comprises:
   a worm drive shaft having one end seated in a base via a bearing and an opposite end in contact with a worm drive motor; and
   threaded flange means attached to the movable picker assembly and in contact with the worm drive shaft.

10. A disc object storage and retrieval mechanism according to claim 9, wherein rotation of the worm drive shaft causes the movable picker assembly to move along the elevator guide rod.

11. A disc-shaped object storage and retrieval mechanism comprising:
   a disc-shaped object storage means for storing a plurality of disc-shaped objects;
   a movable picker assembly which comprises:
      a picker arm support means comprising a plurality of guide rollers oriented about an elevator guide rod which act to laterally constrain the movable picker assembly as it moves along the elevator guide rod;
      a picker arm extending from said picker arm support means and having a curvilinear track for receiving an edge of a disc-shaped object and supporting said disc-shaped object along said edge; and
      a picker wheel selectively movable into engagement with an edge of said disc-shaped object for rotating and driving said disc-shaped object along said track into and out of said disc-shaped object storage means, and
      a means for moving said movable picker assembly.

12. A disc-shaped object storage and retrieval mechanism according to claim 11, wherein said means for moving said movable picker assembly comprises:
   a cable threaded over a series of at least two elevator pulleys and having one end anchored to an outside edge of the movable picker assembly and an opposite end anchored to a center of gravity of the movable picker assembly.

13. A disc-shaped object storage and retrieval mechanism according to claim 12 which further comprises a means for moving said cable.

14. A disc-shaped object storage and retrieval mechanism according to claim 13, wherein said means for moving said cable is a motorized capstan.

15. A disc-shaped object storage and retrieval mechanism according to claim 11 which further comprises:
   a means for actuating said picker wheel; and
   a spindle means.

16. A disc-shaped object storage and retrieval mechanism according to claim 11, wherein said movable picker assembly is vertically displaceable.

17. A disc-shaped object storage and retrieval mechanism according to claim 11, wherein said disc-shaped object storage means comprises a magazine with a plurality of disc-shaped object-supporting V-shaped groove edges for storing disc-shaped objects aligned with one another and spaced apart along a common axis.

18. A disc-shaped object storage and retrieval mechanism according to claim 15, wherein said actuation means is a motorized capstan.

19. A disc-shaped object storage and retrieval mechanism according to claim 15, wherein said actuation means is a motor with a worm-gear drive.

20. A disc-shaped object storage and retrieval mechanism according to claim 11, wherein said disc-shaped object is selected from the group consisting of a video disc, an audio compact disc, a photo compact disc, a silicon wafer, a lens, a mirror, and an optical filter.

21. A disc-shaped object storage and retrieval mechanism according to claim 11, wherein said curvilinear track has a radius of curvature corresponding to a diameter of a disc-shaped object.

22. A disc-shaped object storage and retrieval mechanism according to claim 21, wherein said means for moving said movable picker assembly comprises:
   a worm drive shaft having one end seated in a base via a bearing and an opposite end in contact with a worm drive motor; and
   threaded flange means attached to the movable picker assembly and in contact with the worm drive shaft.

23. A disc-shaped object storage and retrieval mechanism according to claim 22, wherein rotation of the worm drive shaft causes the movable picker assembly to move along the elevator guide rod.

24. A method for driving a disc-shaped object defining a plane into and out of a disc-shaped object storage means which comprises the steps of:
 a) aligning a movable picker assembly having a selectively moveable picker wheel in the same plane with a disc-shaped object which is stored in a disc-shaped object storage means;
 b) engaging an edge of said disc-shaped object with said selectively movable picker wheel; and
 c) rotating said picker wheel to drive said disc-shaped object out of said disc-shaped object storage means and into said movable picker assembly and out of said movable picker assembly and into said disc-shaped object storage means by rolling said disc-shaped object upon said edge of said disc-shaped object.

25. A method according to claim 24, wherein said movable picker assembly is vertically displaceable.

* * * * *